United States Patent

Geil

[15] 3,642,394
[45] Feb. 15, 1972

[54] GAS EJECTING DEVICE FOR COOLING EXTRUDED TUBING

[72] Inventor: Walter Geil, Remscheid-Lennep, Germany
[73] Assignee: Barmer Maschinenfabrik Aktiengesellschaft, Remscheid-Lennep, Germany
[22] Filed: Dec. 2, 1969
[21] Appl. No.: 881,538

[30] Foreign Application Priority Data

Dec. 2, 1968 Germany..................P 18 12 078.0

[52] U.S. Cl..............................................425/72, 138/42
[51] Int. Cl......................................................B29d 23/04
[58] Field of Search..................18/14 S, 14 R, 14 A; 138/42

[56] References Cited

UNITED STATES PATENTS

| | | |
|---|---|---|
| 3,061,876 | 11/1962 | Lloyd et al...........................18/14 S X |
| 3,167,814 | 2/1965 | Gorbett..................................18/14 S |
| 3,296,343 | 1/1967 | Buttolph et al. ....................18/14 S X |
| 3,057,013 | 10/1962 | Loveless..............................18/14 A X |
| 3,320,340 | 5/1967 | Luca....................................18/14 S X |
| 3,492,386 | 1/1970 | Ohmasa et al. .....................18/14 S X |

*Primary Examiner*—J. Spencer Overholser
*Assistant Examiner*—Michael O. Sutton
*Attorney*—W. W. Portz and Irvin L. Groh

[57] ABSTRACT

A device for applying cooling gas in an annular stream to the exterior of a tubing of plastic material as it issues from an extruding machine. The device normally will be of annular configuration and, as usually arranged, is attached to the machine in concentric exterior relation with the extrusion nozzle or die of the machine. The apparatus is interiorly baffled in an essentially radial direction with respect to movement of the tubing to provide uniformity in the temperature, density, and velocity of the gaseous stream as it issues from the device.

9 Claims, 1 Drawing Figure

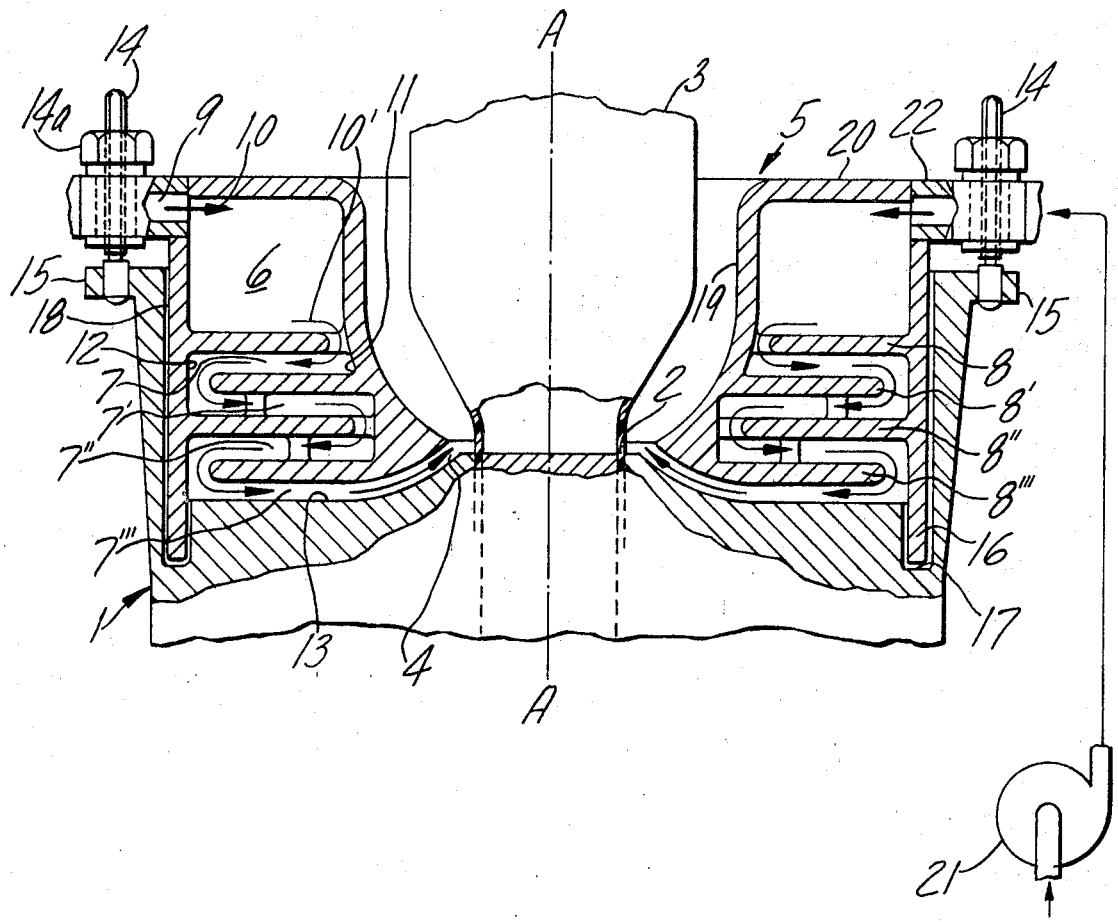
INVENTOR.
WALTER GEIL

GAS EJECTING DEVICE FOR COOLING EXTRUDED TUBING

In the production of blown film, extruded pipe or the like of thermoplastic materials, it is necessary to cool the hot material issuing from the circular nozzle or die of an extruding machine as soon as possible, in order to effect the desired degree of solidification. This is accomplished ordinarily by passing a current of cold air or other suitable gas, such as nitrogen carbon dioxide, or the like over the tubing. In order not to affect the circumference of the tubing differently at different points by blowing such gas on the still hot, highly yielding material, it is necessary to tranquilize or quiet and homogenize the cooling gas blown into the apparatus from a supply source, e.g., one or more blowers, before ejection from the discharge orifice of the cooling gas distribution device.

Known devices have for this purpose a ring-shaped housing utilizing as much of the volume as possible which surrounds the outlet nozzle or die for the hot thermoplastic material and in which the cooling gas is introduced at one or more points. To effect quieting and homogenization, a known ring housing may include, for example, flow shutters in the form of perforated discs or the like. Flow shutters of this kind have the disadvantage that they cause a considerable pressure loss of the flowing gas and hence require higher entrance pressures which, in turn, necessitate more powerful blowers and greater power consumption. There is also the disadvantage of heating the cooling air through increased compression entailed in producing higher supply pressures.

In avoiding the use of flow shutters, it is also known that the ring chamber may be constructed with deflecting walls or other ring-shaped chambers added thereto through which the cooling gas is caused to flow in a zigzag path. In known devices, the supply gas flows radially into an outer ring chamber and is subsequently deflected so that it flows, for example, in the extrusion direction of the tube-extruding and blowing machine. After a short distance the gas is again deflected about 180° and flows in the direction opposite to the direction of tube extrusion. Such direction may be repeated several times so that the zigzag formed chambers through which the cooling gas flows may be arranged concentrically with each other. After leaving the last chamber, the gas is discharged in a substantially homogenized condition through a circular nozzle defining an annular orifice.

Careful measurements of, e.g., flow speed, temperature, and density, have now shown that it is not possible to attain the desired uniformity of these properties with known apparatus. This is shown in a practical way in the cooling speed, always somewhat uneven, shown by the solidifying plastic tubing around its circumference. These differing cooling rates result in undesirable unevenesses as well as differences in thickness of the tubing under some circumstances.

Hence it is an object of the present invention to provide apparatus for the even feeding of cooling gas to the extrusion nozzle of a foil or film-blowing apparatus, a pipe press, an extrusion press, or the like in which practically complete homogenization of the cooling gas, both as to flow speed and as to gas density, is attained.

This object and others apparent hereinafter are achieved in accordance with the present invention by an apparatus in which air or other gas, under pressure from any convenient source such as a blower, is conducted through a normally ring-shaped housing, named herein a cooling ring, mounted concentrically with a die or nozzle orifice through which a plastic material is discharged in tubular form. The housing provides preferably a relatively large initial chamber forming a portion of the passageway for gas through the housing which is substantially larger than one or more smaller chambers disposed in downstream relation with the initial chamber along the passageway through the housing.

In a preferred embodiment, the housing comprises outer and inner axial walls in generally concentric relation with an axis extending centrally through the extrusion nozzle and the tubular product issuing therefrom, and axially spaced radial walls including an end wall most remote from the extrusion nozzle. Except for the end wall, each radial wall connects with one axial wall and is open with respect to the other axial wall while the next adjacent radial wall is connected with the other wall and open adjacent the first wall to develop a radially zigzagging passageway extending from the remote end wall to the region adjacent or in proximity with an end surface of the extrusion nozzle or die. The passageway terminates in an annular discharge orifice in concentric adjacent relation with the annular extrusion orifice of the nozzle or die. The passageway in its widthwise direction forms a substantially continuous circle.

Thus, in contradistinction with the prior art, the baffles of the presently described apparatus are constructed and arranged to cause the gas to travel a zigzag path of which the relatively reversed portions extend in essentially a radial direction to cause a series of momentary expansions and contractions accompanied by corresponding acceleration and decelerations as the gas proceeds through the housing or ring.

In the drawing with respect to which the invention is described, the single FIGURE is a fragmentary elevation with parts in diametral section depicting a cooling ring and an extrusion nozzle in adjustable attached relationship.

The drawing portrays the extruder portion of a tube-blowing machine in its usual orientation, i.e., aligned with its nozzle facing upwardly for discharging a tubing 3 upwardly from an annular orifice 2 of the nozzle in generally concentric relation with an axis A—A. As shown, the tubing 3 of thermoplastic material is emerging from this orifice at first at a diameter corresponding to that of the orifice and then, as it progresses upwardly from the nozzle, is widened to a much greater diameter by blowing.

In order to immediately cool the hot thermoplastic material emerging from the nozzle 1 and thus to solidify it, the tubing 3 is rinsed or engaged along its outside with a cooling gas, which flows through an annular orifice 4 as homogeneously as possible.

To obtain such homogenous condition, a cooling ring 5 is provided which comprises essentially wall structure which provides an annular chamber 6 which is substantially greater in volume than several quieting chambers 7, 7', 7'', etc., connected in series relation therewith to constitute a radially zigzag passageway through the housing forming the cooling ring 5. These quieting chambers are defined by annular radial walls 8, 8', 8'', etc., which extend transversely to the operating direction of the extrusion nozzle. It will be noted that the nozzle orifice, the tubing 3, and the various ring parts are symmetrical with respect to an axis A—A. As shown, the radial walls extend between an outer axial wall 18 and an inner axial wall 19. The axial walls are joined by an end wall 20 which is the radial wall most remote from the nozzle 1 and forms one side of the largest chamber 6. Especially to be noted is that the inner radial walls 8—8''' are connected with the axial walls in a pattern such that, as one radial wall is connected with one axial wall and open adjacent to the other axial wall, the next adjacent radial wall is connected with the other axial wall, and open adjacent to the first axial wall. For example, radial wall 8 connects with wall 18 and is open adjacent to wall 19, whereas radial wall 8' connects with wall 19 and is open adjacent to wall 18.

The ring chamber 6 has at least one and preferably several gas or air supply lines 9 merging preferably in a manifold 22 attached to the wall 18 and distributed as evenly as possible along the circumference of the wall 18. Such supply lines are connected with a gas supply under pressure, such as that initiated by one or more blowers 21. The gas flowing from these lines into the chamber 6, of which the flow path is indicated in the drawing by the arrow 10, enters first into the chamber 6, where a first tranquilizing of the flow occurs as well as a certain equalization of composition or density. After passing through the chamber 6, the gas flows according to the arrow 10' around the first deflecting wall 8 and enters the first adjacent quieting chamber 7. As a result of the arrangement of the deflecting walls 8—8''', the cooling gas is forced to flow from the inner circumference 11 of the wall 19 to the outer circumference 12 to the wall 18. Thus, the gas while traversing this chamber advances progressively through zones of greater cross section than the preceding zone. It will be appreciated that the gas, in moving in a radially outward direction within any one chamber, moves through circular cross sections which rapidly increase in area as the outer wall is approached. This process is reversed, of course, when the gas moves into a chamber in which it travels from the outer axial wall 18 to the inner axial wall 19. In moving radially outwardly there is an increase in volume of the air and decreasing rate of travel which effects the desired quieting of the flow as well as the equalization of the density.

After the cooling air has reached the outer circumference of the quieting chamber 7, it is deflected by 180° and goes into the second quieting chamber 7'. In this chamber, it is forced to flow from the outer wall radially toward the inner wall 19 of the apparatus, and to encounter progressively less volume available at progressively smaller diameters of the chamber 7'. The cooling gas is both accelerated and compressed. This process is repeated several times in flowing through the several quieting chambers so that on entering the last chamber 7''' the stream of air is homogenized to a high degree. This stream of air, guided by the guide surface 13 and the last deflecting or radial wall 8''' is fed through the cooling gas orifice 4 and emerges therefrom as a homogeneous stream or curtain concentrically surrounding the tubing 3 and flowing into converging relation therewith.

The construction of the cooling ring 5 in accordance with that shown makes it possible to build the ring very compactly in a unitary structure, such as a casting. A further feature available from the construction shown is that the axial width of the cooling gas discharge orifice 4 may be varied in simple fashion by adjusting or moving the entire ring in the axial or operating direction of the extrusion nozzle 1. In providing such adjustability, the cooling ring has distributed along its outer circumference several adjusting screws 14 which are solidly anchored in a flange 15 forming an extension of the extrusion nozzle structure. Threaded sleeves 14a rotatably retained in the manifold structure 22 of the ring may be rotated to space the radial wall 8''' at any spacing with the surface 13 consistent with a desirable width of the orifice 4. The cooling ring has an extension 16 of the outer axial wall 18 which serves as a tongue received in a corresponding recess 17 of the nozzle structure to provide sufficient sealing against escape of cooling gas into the atmosphere from the intended passageway therefor.

What is claimed is:

1. Apparatus for feeding an annular stream of cooling gas into concentric relation with a path traversed by plastic tubing in passing in the operating direction of the apparatus away from a circular extrusion orifice of the apparatus, said orifice having an axis generally centered along said path comprising:
    housing means providing axially extending outer and inner walls in generally outward spaced concentric relation with said path, and radially extending baffle means arranged between said walls to define a generally annular passageway substantially encircling said inner wall which zigzags radially outwardly and inwardly between said axial walls and extends in an axial direction from an end wall in remote relation with a surface containing said extrusion orifice and terminates in a circular discharge orifice adjacent said extrusion orifice for said stream of cooling gas;
    said housing means having inlet port means contiguous with the end of said passageway adjacent said end wall for admitting cooling gas thereinto.

2. The apparatus of claim 1 comprising:
    means for adjusting the axial width of said circular discharge orifice.

3. The apparatus of claim 1 wherein:
    said baffle means provides said passageway in a width substantially encircling said axis.

4. The apparatus of claim 1 wherein:
    said baffle means is arranged to provide an initial chamber as a portion of said passage which is substantially larger than a chamber subsequently formed in said passageway.

5. Apparatus for feeding an annular stream of cooling gas into concentric relation with a path transversed by plastic tubing in passing in the operating direction of the apparatus away from a circular extrusion orifice of the apparatus, said orifice having an axis generally centered along said path comprising:
    housing means providing outer and inner axially extending walls in generally outward spaced concentric relation with said path, said outer wall projecting from a surface of the apparatus containing said extrusion orifice in substantially airtight connection therewith, and a plurality of axially spaced radial walls including an end wall most axially remote from said orifice joining with said axial walls, each of said radial walls inwardly of said end wall being open adjacent one of said axial walls and the next adjacent radial wall being open adjacent the other axial wall to define a generally annular passageway which zigzags radially outwardly and inwardly between said axial walls and extends in an axial direction from inside said end wall toward said apparatus surface and terminates in a circular discharge orifice adjacent said extrusion orifice for said stream of cooling gas;
    said housing means having inlet port means for admitting cooling gas into the space between said end wall and the next adjacent radial wall.

6. Apparatus for feeding an annular stream of cooling gas into concentric relation to a path traversed by plastic tubing in passing in the operating direction of the apparatus away from a circular extrusion orifice having an axis generally centered along said path comprising:
    die means providing said orifice and a wall surface in outward concentric relation therewith;
    a cooling ring comprising radially spaced outer and inner axially extending walls in generally outward spaced concentric relation with said path, and a plurality of axially spaced radial walls including an end wall most remote from said orifice joined with said axial walls of which one radial wall is open adjacent one axial wall and the next adjacent radial wall is open adjacent the other axial wall to provide a generally annular passageway which zigzags radially outwardly and inwardly between said axial walls and extends in an axial direction from said end wall to said wall surface; and
    means for attaching said ring to the die means with said outer wall in substantially sealed relation therewith and said wall surface in spaced relation with the nearest of said radial walls, said nearest radial wall terminating inwardly in spaced relation with said wall surface to define a circular discharge orifice adjacent said extrusion orifice for discharging said stream of cooling gas;
    said ring having inlet port means for admitting gas into the space between said end wall and the next adjacent end wall.

7. The apparatus of claim 6 wherein all portions of the passageway encircle said axis in the widthwise direction of the passageway, and the passageway is substantially free of structure extending transversely to the direction of movement of gas therethrough.

8. The apparatus of claim 6 wherein:
    the space between said end wall and the next adjacent radial wall is greater than between other pairs of adjacent radial walls.

9. The apparatus of claim 6 wherein:
    said outer wall and said die means having relatively movable, axially overlapping portions maintaining said sealed relationship; and
    the apparatus comprising means for adjusting the ring toward and away from the die means to vary the axial width of gas discharge orifice.

* * * * *